(12) United States Patent
Forsberg et al.

(10) Patent No.: US 8,331,906 B2
(45) Date of Patent: Dec. 11, 2012

(54) METHODS, APPARATUSES, SYSTEM, AND RELATED COMPUTER PROGRAM PRODUCTS FOR HANDOVER SECURITY

(75) Inventors: Dan Lars Anders Forsberg, Helsinki (FI); Pentti Valtteri Niemi, Lausanne (FI)

(73) Assignee: Nokia Corporation, Espoo (FI)

( * ) Notice: Subject to any disclaimer, the term of this patent is extended or adjusted under 35 U.S.C. 154(b) by 36 days.

(21) Appl. No.: 12/809,959

(22) PCT Filed: Dec. 8, 2008

(86) PCT No.: PCT/EP2008/067006
§ 371 (c)(1),
(2), (4) Date: Jul. 21, 2010

(87) PCT Pub. No.: WO2009/080480
PCT Pub. Date: Jul. 2, 2009

(65) Prior Publication Data
US 2011/0201337 A1 Aug. 18, 2011

Related U.S. Application Data

(60) Provisional application No. 61/015,150, filed on Dec. 19, 2007.

(51) Int. Cl.
*H04M 1/66* (2006.01)
(52) U.S. Cl. ........ 455/410; 455/411; 455/436; 370/331; 370/338; 380/270; 380/272
(58) Field of Classification Search .................. 455/410, 455/411, 436; 370/331, 338; 380/270, 272–273
See application file for complete search history.

(56) References Cited

U.S. PATENT DOCUMENTS

| 5,081,679 | A  | * | 1/1992 | Dent ............................ 380/272 |
| 6,522,874 | B1 | * | 2/2003 | Chu et al. ...................... 455/411 |
| 6,594,489 | B2 | * | 7/2003 | Holcman .................. 455/432.1 |
| 6,876,747 | B1 | * | 4/2005 | Faccin et al. .................. 380/247 |

(Continued)

FOREIGN PATENT DOCUMENTS

EP 1605722 A 12/2005

(Continued)

OTHER PUBLICATIONS

Ericsson, "Clarification of the Security Mode Control Procedure" [Online] Dec. 3, 1999, www.3gpp.org/ftp/tsg_ran/WG2_RL2/TSGR2_09/Docs/Zips/R2-99k58.doc.

(Continued)

*Primary Examiner* — Sharad Rampuria
(74) *Attorney, Agent, or Firm* — Alston & Bird LLP (57) ABSTRACT

It is disclosed a method comprising receiving, prior to a handover operation, first key indication information, creating, prior to the handover operation, key information based on the received first key indication information, retaining the created key information, sending, after the handover operation, the received first key indication information associated with the key information created prior to the handover operation, and retrieving, after the handover operation, the retained key information based on the first key indication information; and a method comprising generating, prior to the handover operation, the first key indication information associated with key information intended to be created, sending, prior to the handover operation, the generated first key indication information, and receiving, after the handover operation, second key indication information corresponding to the generated first key indication information.

17 Claims, 3 Drawing Sheets

U.S. PATENT DOCUMENTS

| | | | |
|---|---|---|---|
| 7,020,455 B2 * | 3/2006 | Krishnarajah et al. | 455/410 |
| 7,065,340 B1 * | 6/2006 | Einola et al. | 455/410 |
| 7,403,621 B2 * | 7/2008 | Vialen et al. | 380/272 |
| 7,624,267 B2 * | 11/2009 | Huang et al. | 713/168 |
| 7,664,265 B2 * | 2/2010 | Isokangas et al. | 380/247 |
| 8,005,224 B2 * | 8/2011 | Nakhjiri et al. | 380/272 |
| 8,027,304 B2 * | 9/2011 | Forsberg | 370/331 |
| 8,027,679 B2 * | 9/2011 | Prasad | 455/436 |
| 8,046,583 B2 * | 10/2011 | Taniguchi | 713/171 |
| 8,107,629 B2 * | 1/2012 | Ryu et al. | 380/272 |
| 8,145,195 B2 * | 3/2012 | Forsberg et al. | 455/411 |
| 2003/0076859 A1 | 4/2003 | Jiang | |
| 2004/0039910 A1 * | 2/2004 | Isokangas et al. | 713/171 |
| 2005/0265551 A1 * | 12/2005 | Hara | 380/270 |
| 2007/0003062 A1 | 1/2007 | Mizikovsky et al. | |
| 2007/0249352 A1 * | 10/2007 | Song et al. | 455/436 |
| 2009/0313466 A1 * | 12/2009 | Naslund et al. | 713/155 |
| 2010/0002883 A1 * | 1/2010 | Sammour et al. | 380/272 |
| 2010/0172500 A1 * | 7/2010 | Wu | 380/272 |

FOREIGN PATENT DOCUMENTS

| | | |
|---|---|---|
| WO | 0215600 A | 2/2002 |

OTHER PUBLICATIONS

3GPP SA3: "Ls on Key Change in Lte Active Mode" [online] May 25, 2007, www.3gpp.org/ftp/tsg_sa/WG3_Security/TSGS3_47_Tallinn/Docs/S3-070475.zip.

Nokia Siemens Networks: "Key change during LTE_Active" [online] Mar. 21, 2007, www.3gpp_org/ftp/tsg_sa/WG3_Security/TSGS3_46b_LTESAE_adHoc_SophiaAntipolis/Docs/S3-070240.zip.

International Search Report and Written Opinion of the International Searching Authority for PCT/EP2008/056554 dated Jul. 1, 2008, pp. 1-14.

European Search and Examination report for EP 07109901.4 dated Nov. 22, 2007, pp. 1-15.

International Telecommunication Union, ITU-T G.114,"One-way transmission time", May 2003, pp. 1-20.

Nokia Siemens Networks/Nokia, "Evaluation of key change on the fly solutions", 3GPP TSG SA WG3 Security SA3#47, May 22-25, 2007, pp. 1-4.

International Search Report and Written Opinion of the International Searching Authority of PCT/EP2008/067006, dated Jun. 10, 2009, pp. 1-13.

"Universal Mobile Telecommunications System (UMTS); 3G Security; Security Architecture (3GPP TS 33.102 Version 7.1.0 Release 7); ETSI TS 133 102" ETSI Standards, LIS, Sophia Antipolis, Cedex, France, vol. 3-SA3, No. V7.1.0, Dec. 1, 2006.

Office Action dated Jun. 20, 2012 from corresponding Chinese Patent Application No. 200880119761.1 (13 pages).

* cited by examiner

Fig. 2

METHODS, APPARATUSES, SYSTEM, AND RELATED COMPUTER PROGRAM PRODUCTS FOR HANDOVER SECURITY

RELATED APPLICATION

This application was originally filed as PCT Application No. PCT/EP2008/067006 filed Dec. 8, 2008, which claims priority benefit to U.S. Provisional Application No. 61/015,150, filed Dec. 19, 2007.

FIELD OF THE INVENTION

The present invention relates to methods, apparatuses, a system and related computer program products for handover security. In particular, the present invention may also relate to UTRAN (UMTS (universal mobile telecommunications system) terrestrial radio access network), GERAN (GSM (Global System for Mobile communication) EDGE (Enhanced Data rates for Global Evolution) Radio Access Network), E-UTRAN (evolved UTRAN), 3GPP ($3^{rd}$ generation partnership project) EPS (evolved packet system)/E-UTRAN key management and key hierarchy, inter-system handovers, UTRAN/GERAN key management, UTRAN/GERAN CK/IK (ciphering key/integrity key) key usage in HSPA (high speed packet access) evolution and so-called home NodeBs.

BACKGROUND

In 3GPP ($3^{rd}$ Generation Partnership Project), there have been discussions related to handover security.

There have been approaches directed to:

performing AKA (authentication and key agreement) immediately after a handover to E-UTRAN, and subsequently performing a key change on-the-fly (discussed e.g. in the 3GPP SA3 (system architecture 3));

using of a key hierarchy also for an update of e.g. the UTRAN/GERAN side (to be described herein below); and a partial solution for key caching for E-UTRAN, which has been mentioned in 3GPP SA3.

However, in view of the above, in case CK and IK keys used e.g. on the UTRAN/GERAN side are compromised (such as an attacker getting the CK/IK keys from an RNC (radio network controller), a home Node B, or a HSPA base station) and handover to E-UTRAN occurs, there resides a problem in that the E-UTRAN keys will be compromised as well, as they are based on the transferred CK/IK e.g. from UTRAN/GERAN side to the E-UTRAN.

In consideration of the above, it is an object of the present invention to overcome one or more of the above drawbacks. In particular, the present invention provides methods, apparatuses, a system and related computer program products for handover security.

According to the present invention, in a first aspect, this object is for example achieved by a method comprising:

receiving, prior to a handover operation, first key indication information;

creating, prior to the handover operation, key information based on the received first key indication information;

retaining the created key information, sending, after the handover operation, the received first key indication information associated with the key information created prior to the handover operation; and retrieving, after the handover operation, the retained key information based on the first key indication information.

According to further refinements of the invention as defined under the above first aspect, the method further comprises sending a response indicative of the successful creating;

the handover operation is performed between a first network entity and a second network entity;

at least one of the receiving prior to the handover operation and the creating is a portion of a challenge/response protocol;

the challenge/response protocol is constituted by at least one of an authentication and key agreement protocol and an extensible authentication protocol;

the retaining comprises dispensing with a security mode command;

the key information comprises at least one of a ciphering key and an integrity key;

the first key identification information comprises a key set identifier.

According to the present invention, in a second aspect, this object is for example achieved by a method comprising:

generating, prior to a handover operation, first key indication information associated with key information intended to be created;

sending, prior to the handover operation, the generated first key indication information; and receiving, after the handover operation, second key indication information corresponding to the generated first key indication information.

According to further refinements of the invention as defined under the above second aspect, the method further comprises receiving a response indicative of the successful creating;

the handover operation is performed between a first network entity and a second network entity;

at least one of the generating and the sending is a portion of a challenge/response protocol;

the challenge/response protocol is constituted by at least one of an authentication and key agreement protocol and an extensible authentication protocol;

the receiving after the handover operation comprises a security context transfer;

at least one of the first and second key identification information comprises a key set identifier.

According to the present invention, in a third aspect, this object is for example achieved by an apparatus comprising:

a receiver configured to receive, prior to a handover operation, first key indication information;

a creator configured to create, prior to the handover operation, the first key information based on the key indication information received by the receiver;

a retainer configured to retain the key information created by the creator;

a sender configured to send, after the handover operation, the first key indication information received by the receiver and associated with the key information created by the creator prior to the handover operation; and a retriever configured to retrieve, after the handover operation, the key information retained by the retainer based on the first key indication information.

According to further refinements of the invention as defined under the above third aspect, the sender is configured to send a response indicative of a successful creating of the first key information;

the handover operation is performed between a first network entity and a second network entity;

at least one of the receiver and the creator is configured to perform at least a portion of a challenge/response protocol;

the challenge/response protocol is constituted by at least one of an authentication and key agreement protocol and an extensible authentication protocol;

the retainer is further configured to dispense with a security mode command;

the key information comprises at least one of a ciphering key and an integrity key;

the first key identification information comprises a key set identifier;

the apparatus is a user equipment;

the apparatus is compliant to at least one of a universal mobile telecommunications system terrestrial radio access network, a global system for mobile communication enhanced data rates for global evolution radio access network and an evolved universal mobile telecommunications system terrestrial radio access network.

According to the present invention, in a fourth aspect, this object is for example achieved by an apparatus comprising:

a generator configured to generate, prior to a handover operation, first key indication information associated with key information intended to be created;

a sender configured to send, prior to the handover operation, the first key indication information generated by the generator; and a receiver configured to receive, after the handover operation, second key indication information corresponding to the first key indication information generated by the generator.

According to further refinements of the invention as defined under the above fourth aspect, the receiver is configured to receive a response indicative of a successful creating of the first key information;

the handover operation is performed between a first network entity and a second network entity;

at least one of the generator and the sender is configured to perform a portion of a challenge/response protocol;

the challenge/response protocol is constituted by at least one of an authentication and key agreement protocol and an extensible authentication protocol;

the receiver is further configured to receive based on a security context transfer;

at least one of the first and second key identification information comprises a key set identifier;

the apparatus is constituted by at least one of a serving general packet radio service support node and a mobility management entity.

According to the present invention, in a fifth aspect, this object is for example achieved by an apparatus comprising:

means for receiving, prior to a handover operation, first key indication information;

means for creating, prior to the handover operation, key information based on the first key indication information received by the means for receiving;

means for retaining the key information created by the means for creating;

means for sending, after the handover operation, the first key indication information received by the means for receiving and associated with the key information created by the means for creating prior to the handover operation; and means for retrieving, after the handover operation, the key information retained by the means for retaining based on the first key indication information.

According to the present invention, in a sixth aspect, this object is for example achieved by an apparatus comprising:

means for generating, prior to a handover operation, first key indication information associated with key information intended to be created;

means for sending, prior to the handover operation, the first key indication information generated by the means for generating; and means for receiving, after the handover operation, second key indication information corresponding to the key indication information generated by the means for generating.

According to further refinements of the invention as defined under the above third to sixth aspects, the apparatus is implemented as a chipset or module.

According to the present invention, in a seventh aspect, this object is for example achieved by a system comprising at least one of:

an apparatus according to the third aspect; and
an apparatus according to the fourth aspect; and
an apparatus according to the fifth aspect; and
an apparatus according to the sixth aspect.

According to the present invention, in an eighth aspect, this object is for example achieved by a computer program product comprising code means configured to carry out a method comprising:

receiving, prior to a handover operation, first key indication information;

creating, prior to the handover operation, key information based on the received first key indication information;

retaining the created key information;

sending, after the handover operation, the received first key indication information associated with the key information created prior to the handover operation; and retrieving, after the handover operation, the retained key information based on the first key indication information.

According to further refinements of the invention as defined under the above eighth aspect, the computer program product is embodied on a computer-readable medium.

According to the present invention, in a ninth aspect, this object is for example achieved by a computer program product comprising code means configured to carry out a method comprising:

generating, prior to a handover operation, first key indication information associated with key information intended to be created;

sending, prior to the handover operation, the generated first key indication information; and receiving, after the handover operation, second key indication information corresponding to the generated first key indication information.

According to further refinements of the invention as defined under the above ninth aspect, the computer program product is embodied on a computer-readable medium.

In this connection, it has to be pointed out that the present invention enables one or more of the following:

Portability of keys e.g. into the E-UTRAN side.

Independency from a release version e.g. of the SGSN (serving GPRS (general packet radio service) support node) involved.

Independency from a release version of the UE (user equipment), since the AKA may be performed without the SMC (security mode command).

Enabling detection of the release version of the UE (e.g. if handover to E-UTRAN is possible for the UE, UE is Release 8 or newer).

Efficient usage of the KSI (key set identifier) in order to identify keys also on the E-UTRAN side (e.g. if the KSI points to the previous (so called "old") CK and IK used on the UTRAN/GERAN side or to the new keys based on the AKA without respective SMC procedure).

Integrity protection e.g. of the first message to the E-UTRAN (e.g. service request or initial L3 (level 3) message or RRC (radio resource control) connection request, etc.), since with cached and transferred keys (handover from UTRAN/GERAN to E-UTRAN), the UE can sign e.g. the first message to the E-UTRAN.

Faster detach-to-attach transition due to security context caching, especially in handovers back to the E-UTRAN independently of the source RAT (radio access technology).

Enabling failure recovery e.g. in case radio connection to the source RAT was lost (i.e. security context caching in E-UTRAN does not require any information from other RATS).

BRIEF DESCRIPTION OF THE DRAWINGS

An embodiment of the present invention is described herein below with reference to the accompanying drawings, in which.

DETAILED DESCRIPTION OF AN EMBODIMENT OF THE PRESENT INVENTION

An embodiment of the present invention is described herein below by way of example with reference to the accompanying drawings.

It is to be noted that for this description, the terms "ciphering key/integrity key, key set identifier, SGSN and MME" are examples for "key information, key indication information, first network entity and second network entity", without restricting the latter-named terms to the special technical or implementation details imposed to the first-named terms.

Figure 1:
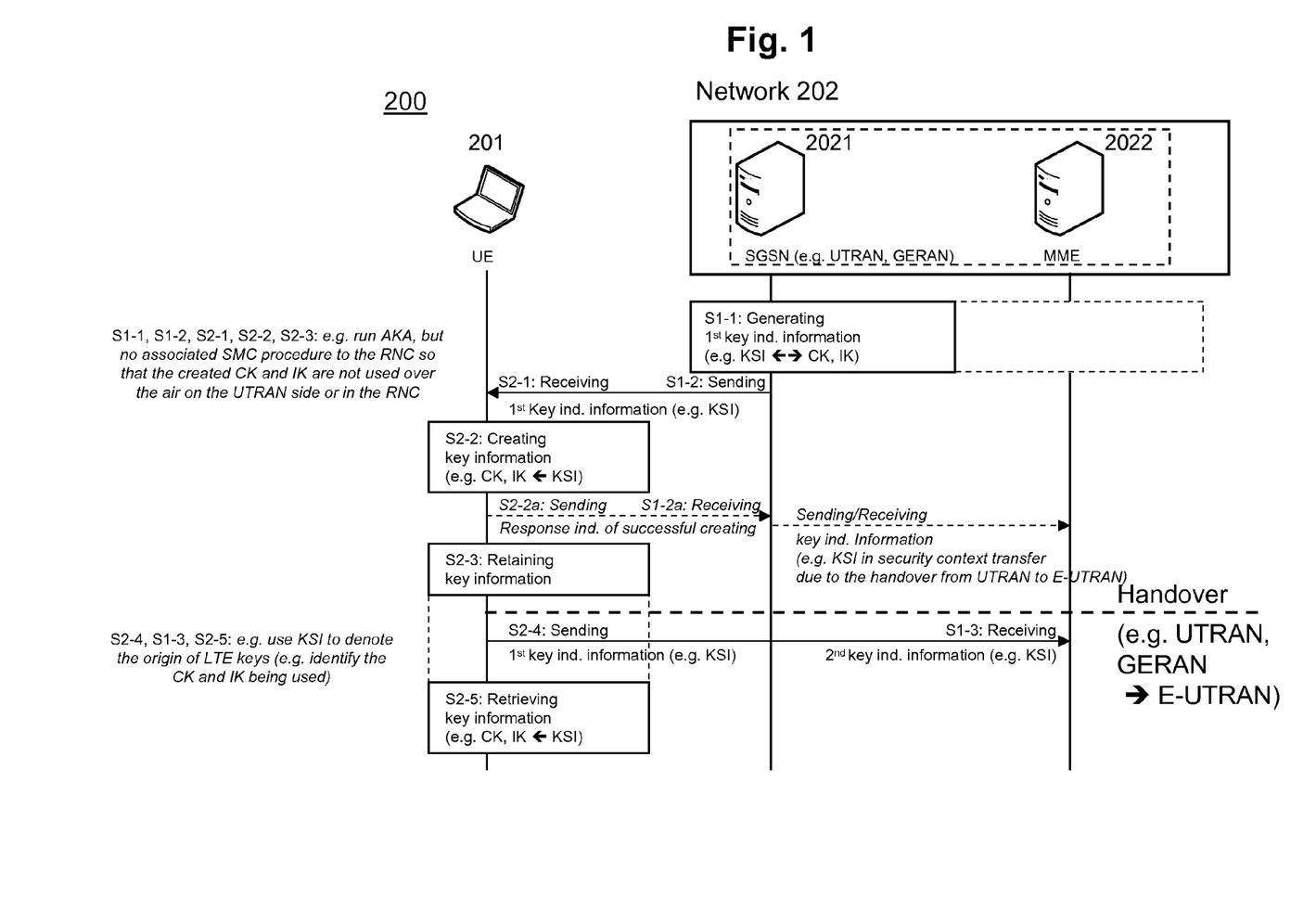
FIG. 1 shows respective methods for handover security according to an embodiment of the present invention.

FIG. 1 shows methods for handover security according to the embodiment of the present invention. Signaling between elements is indicated in horizontal direction, while time aspects between signaling are reflected in the vertical arrangement of the signaling sequence as well as in the sequence numbers. It is to be noted that the time aspects indicated in FIG. 1 do not necessarily restrict any one of the method steps shown to the step sequence outlined. This applies in particular to method steps that are functionally disjunctive with each other, for example, the optional step on sending/receiving key indication information from an SGSN to an MME (e.g. a security context transfer due to the handover from UTRAN/GERAN to E-UTRAN) may be performed anytime before the handover operation, and the optional step of sending/receiving a response indicative of a successful creating may be performed anytime before the handover operation.

As shown in FIG. 1, a communication network 200 may comprise a user equipment UE 201 and a network 202. The network 202 may in turn comprise a first network entity (referred to as "SGSN" hereinafter) 2021 and a second network entity (referred to as "MME" hereinafter) 2022. The SGSN 2021 and the MME 2022 may also be disposed as an integral entity, as indicated by the dashed box surrounding the functional blocks of the SGSN 2021/MME 2022.

In step S1-1, e.g. the SGSN 2021 may perform generating, prior to a handover operation (e.g. between a UTRAN/GERAN-based side of the network 202 and an E-UTRAN-based side of the network 202, as indicated by a thick dashed line in FIG. 1), first key indication information (e.g. a first key set identifier KSI) associated with key information intended to be created (e.g. to be created in the UE 201).

In step S1-2, e.g. the SGSN 2021 may perform sending, prior to the handover operation, the generated first key indication information (e.g. the key set identifier) e.g. to the UE 201. In step S2-1, e.g. the UE 201 may perform receiving, also prior to the handover operation, the first key indication information (e.g. KSI).

Then, in step S2-2, e.g. the UE 201 may perform creating, prior to the handover operation, key information (e.g. a ciphering key CK and/or an integrity key IK) based on the received first key indication information (e.g. CK, IK based on the KSI received).

Optionally, in step S2-2a, e.g. the UE 201 may perform sending a response indicative of the successful creating, and in step S1-2a, e.g. the SGSN 2021 may perform receiving the response. This transmitting of the response may be performed in order to provide the network 202 with information whether or not the UE 201 now holds the key information.

In step S2-3, e.g. the UE 201 may perform retaining the generated key information (such as retaining CK and/or IK for later usage e.g. after the handover).

Furthermore, steps S1-1, S1-2, S2-1, S2-2 and S2-3 may be summarized according to the following without being restricted thereto: e.g. an (EAP-) AKA may be run without an associated SMC procedure to the RNC, so that the created CK and IK may not be used e.g. over the air on the UTRAN/GERAN side or in the RNC.

It is to be noted that anytime prior to the handover, the optional steps of sending and receiving the key indication information (e.g. KSI) may be performed between the SGSN 2021 and the MME 2022 e.g. in case the SGSN 2021 and the MME 2021 are disposed as separate entities (indicated by the dashed arrow between SGSN 2021 and MME 2022 in FIG. 1). In turn, the above optional steps may also be omitted e.g. in case the SGSN 2021 and the MME 2021 are disposed as a single/combined entity. For example, these optional steps may e.g. be effected as a part of a security context transfer due to the handover e.g. from UTRAN/GERAN to E-UTRAN.

In step S2-4, e.g. the UE 201 may perform sending, after the handover operation, the received first key indication information (e.g. KSI) associated with the key information (e.g. CK and/or IK) created prior to the handover operation. In step S1-3, e.g. the MME 2022 may perform receiving, after the handover operation, the first key indication information e.g. from the UE 201 as second key generation information (e.g. KSI) corresponding to the generated first key indication information (e.g. KSI).

And, in step S2-5, e.g. the UE 201 may perform retrieving, after the handover operation, the retained key information (e.g. CK and/or IK) based on the first key indication information (e.g. KSI).

Furthermore, steps S2-4, S1-3 and S2-5 may be summarized according to the following without being restricted thereto: use e.g. KSI to denote the origin of E-UTRAN keys (e.g. identify the CK and IK being used e.g. between the UE 201 and the MME 2022)

According to further developments of the methods according to the present invention, the handover operation may be performed between a first network entity (such as an SGSN e.g. on the UTRAN/GERAN-based side of the network 202) and a second network entity (such as an MME e.g. on the E-UTRAN-based side of the network 202). In addition, a challenge/response protocol may be constituted by an authentication and key agreement (AKA) protocol and/or an extensible authentication protocol (EAP). Furthermore, the key information may comprise at least one of a ciphering key (CK) and an integrity key (IK), and the first and/or second key identification information may comprise a key set identifier (KSI).

According to further developments of the method related e.g. to the UE 201, at least one of the receiving and the creating may be a portion of the challenge/response protocol (e.g. the above (EAP-) AKA protocol). In addition, the retaining may comprise dispensing with an SMC (security mode command). Furthermore, the UE 201 may further perform sending the response indicative of the successful creating.

According to further developments of the method related e.g. to the SGSN 2021/MME 2022, at least one of the generating and the sending prior to the handover operation may be a portion of the challenge/response protocol (e.g. the above (EAP-) AKA protocol). Moreover, the receiving after the handover operation may comprise a security context transfer.

Figure 2:
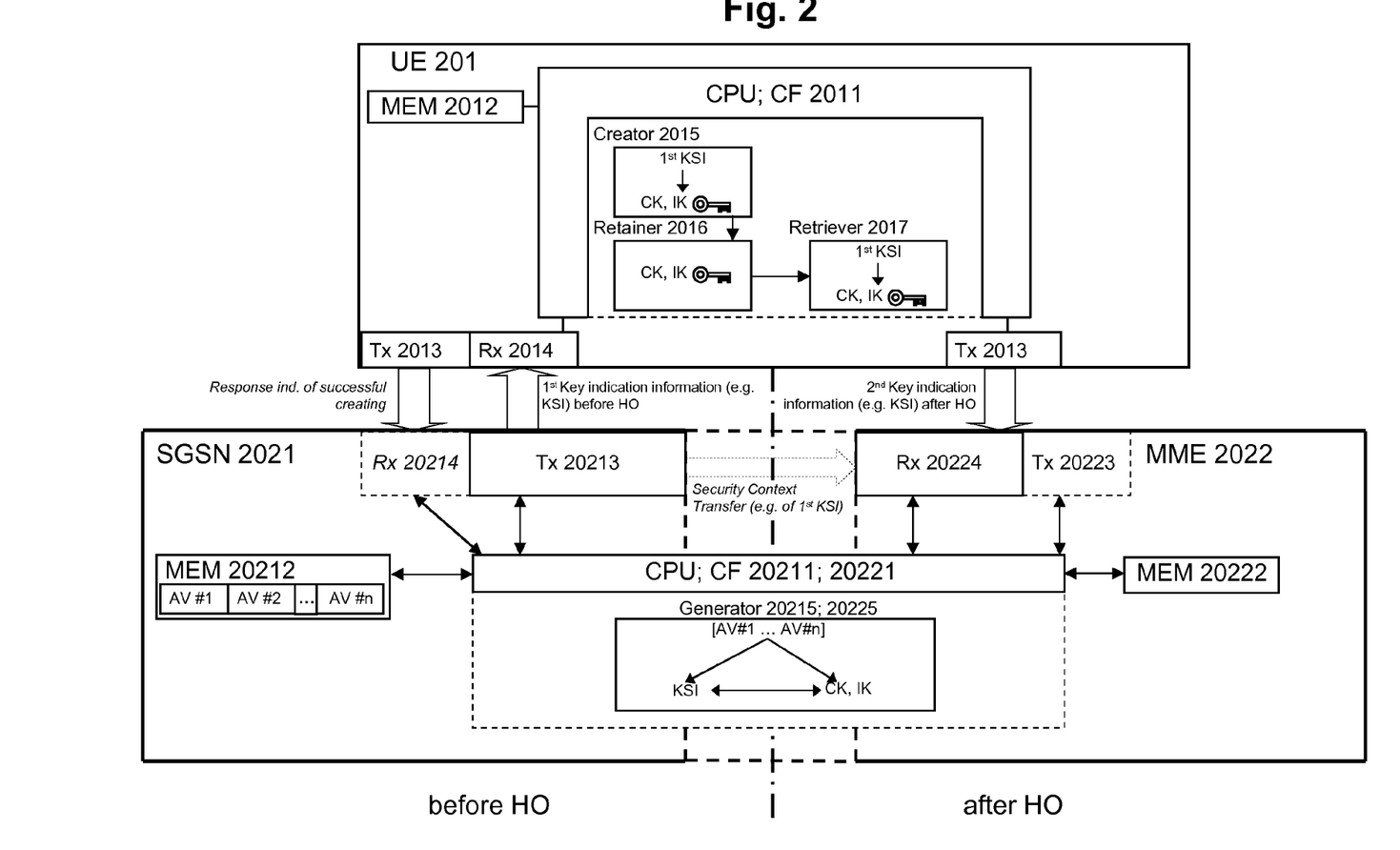
FIG. 2 shows respective apparatuses (e.g. SGSN/MME (mobility management entity) and UE) for handover security according to the embodiment of the present invention.

FIG. 2 shows respective apparatuses (e.g. UE 201 and SGSN 2021/MME 2022) for handover security according to the embodiment of the present invention. Within FIG. 2, for ease of description, portions providing main functionalities are depicted with solid functional blocks and a normal font, while portions providing optional functions are depicted with dashed functional blocks and an italic font.

The UE 201 may comprise a central processing unit CPU or core functionality CF (referred to as "CPU" hereinafter) 2011, a memory 2012, a sender Tx 2013, a receiver Rx 2014, a creator 2015, a retainer 2016 and a retriever 2017. It is to be noted that the sender 2013 may also become mandatory for the UE 201 e.g. for performing data communication with the SGSN 2021/MME 2022.

The SGSN 2021 may comprise a CPU (or core functionality CF) 20211, a memory 20212 for holding authentication vectors AV #1, . . . , AV #n (supplied e.g. from a home subscriber server not shown), a sender Tx 20213, an optional receiver Rx 20214 and a generator 20215. The MME 2022 may comprise a CPU 20221, a memory 20222, an optional sender Tx 20223, a receiver Rx 20224 and a generator 20225. As indicated by the dashed extension (CPU 20211; 20221 of the SGSN 2021/MME 2022) or the dashed recess (CPU 2011 of the UE 201) of the functional blocks of the CPUs 2011 and 20211; 20221, the generator 20215; 20225, the creator 2015, the retainer 2016 and the retriever 2017 may be functionalities running on the CPUs 2011 and 20211; 20221 or may alternatively be separate functional entities or means. Furthermore, the generator 20215 and 20225 may be interchangeably disposable between the SGSN 2021 and the MME 2022, no matter whether the SGSN 2021 and the MME 2022 are disposed as separate entities or as a single/combined entity.

The CPUs $20x1$ (wherein x=1, 21, and 22) may respectively be configured to process various data inputs and to control the functions of the memories $20x2$, the senders $202x3$ and the receivers $20x4$ (and the creator 2015, the retainer 2016 and the retriever 2017 of the UE 201 as well as the generator 20215; 20225 of the SGSN 2021/MME 2022). The memories $20x2$ may respectively serve e.g. for storing code means for carrying out e.g. the respective method according to the invention, when run on the CPUs $20x1$. It is to be noted that the (optional) senders $20x3$ and the (optional) receivers $20x4$ may alternatively be provided as respective integral transceivers (not shown) or as separate entities. It is further to be noted that the senders/receivers may be implemented i) as physical senders/receivers for transceiving e.g. via the air interface (e.g. in case of the UE 201), or ii) as routing entities e.g. for sending/receiving data packets e.g. in a PS (packet switched) network (e.g. between SGSN 2021 and MME 2022 when disposed as separate network entities), or iii) as functionalities for writing/reading information into/from a given memory area (e.g. in case of shared/common CPUs or memories e.g. of the SGSN 2021 and MME 2022 when disposed as an integral network entity), or iv) as any suitable combination of i) to iii).

Furthermore, as indicated by the dashed connections between the functional blocks of the SGSN 2021 and MME 2022, it is to be noted that the SGSN 2021 and the MME 2022 may also be implemented as an integral/combined entity, as mentioned above. In that case, the CPUs 20211, 20221, the memories 20212, 20222, the (optional) senders 20213, 20223 and the (optional) receivers 20234, 20244 may respectively be common and/or shared resources.

Accordingly, e.g. the generator 20215; 20225 of the SGSN 2021/MME 2022 e.g. in conjunction with the CPU 20211; 20221 may be configured to generate, prior to a handover operation (see left-hand side of the dash-dotted line in FIG. 2, labeled "before HO"), first key indication information (e.g. a key set identifier KSI) associated with key information (e.g. CK and/or IK) intended to be created (e.g. to be created by the generator 2015 of the UE 201). The key set identifier may be created from a common one of the authentication vectors AV #1, . . . , AV #n.

And, e.g. the sender 20213; 20223 of the SGSN 2021/MME 2022 may be configured to send, prior to the handover operation, the first key indication information (e.g. KSI) generated by the generator 20215; 20225. Then, e.g. the receiver 2014 of the UE 201 may be configured to receive, prior to the handover operation, the first key indication information (e.g. KSI).

For example, the creator 2015 of the UE 201 may be configured to create, prior to the handover operation, key information (e.g. CK and/or IK) based on the first key indication information (e.g. CK, IK based on KSI) received by the receiver 2014.

Optionally, e.g. the sender 2013 of the UE 201 may be configured to send the response indicative of a successful creation of the first key information. And, e.g. the receiver 20214 of the SGSN 2021 may be configured to receive the response. This transmitting of the response may be performed in order to provide the SGSN 2021 and subsequently the MME 2022 with information whether or not the UE 201 now holds the first key information.

Then, e.g. the retainer 2016 of the UE 201 may be configured to retain the key information (e.g. retaining CK and/or IK for later usage after the handover operation) created by the creator 2015.

Furthermore, e.g. the sender 2013 of the UE 201 may further be configured to send, after the handover operation, the first key indication information (e.g. key set identifier KSI) associated with the key information (e.g. CK and/or IK) created by the creator 2015 prior to the handover operation. Consequently, e.g. the receiver 20214; 20224 of the SGSN 2021/MME 2022 may further be configured to receive, after the handover operation (see right-hand side of the dash-dotted line in FIG. 2, labeled "after HO"), the first key indication information (e.g. from UE 201) as second key indication information (e.g. KSI relating to CK and/or IK retained in the UE 203) corresponding to the first key indication information (e.g. KSI relating to the corresponding CK and/or IK e.g. in the MME 2022) generated by the generator 20215; 20225.

And, e.g. the retriever 2017 of the UE 201 may be configured to retrieve, after the handover operation, the key information (e.g. CK and/or IK) retained by the retainer 2016 based on the key indication information (e.g. KSI).

According to further developments of the apparatuses (e.g. UE 201 and SGSN 2021/MME 2022) according to the present invention, the handover operation may be performed between a first network entity (such as an SGSN e.g. on the UTRAN/GERAN-based side of the network 202) and a second network entity (such as an MME e.g. on the E-UTRAN-based side of the network 202). In addition, a challenge/response protocol may be constituted by an authentication and key agreement (AKA) protocol and/or an Extensible Authentication Protocol (EAP)-AKA. Furthermore, the key information may comprise at least one of a ciphering key (CK) and an integrity key (IK), and the first and/or second key identification information may comprise a key set identifier (KSI).

According to further developments of the e.g. of the UE 201, at least one of the receiver 2014 and the creator 2015 may be configured to perform a portion of the challenge/response protocol (e.g. the above (EAP-) AKA protocol). In addition, the retainer 2016 may be further configured to dispense with the SMC (security mode command). Finally, the UE may be compliant to at least one of a universal mobile telecommunications system terrestrial radio access network (UTRAN), a global system for mobile communication enhanced data rates for global evolution radio access network (GERAN) and an evolved UTRAN. Furthermore, the sender 2013 may be configured to send the response indicative of the successful creation of the first key information.

According to further developments of the e.g. of the SGSN 2021/MME 2022, at least one of the generator 20215; 20255 and the sender 20213 may be configured to perform a portion of the challenge/response protocol (e.g. the above (EAP-) AKA protocol). Moreover, the receiver 20224 may be configured to receive based on a security context transfer. Furthermore, the receiver 20214 may be further configured to receive the above-described response.

Figure 3:
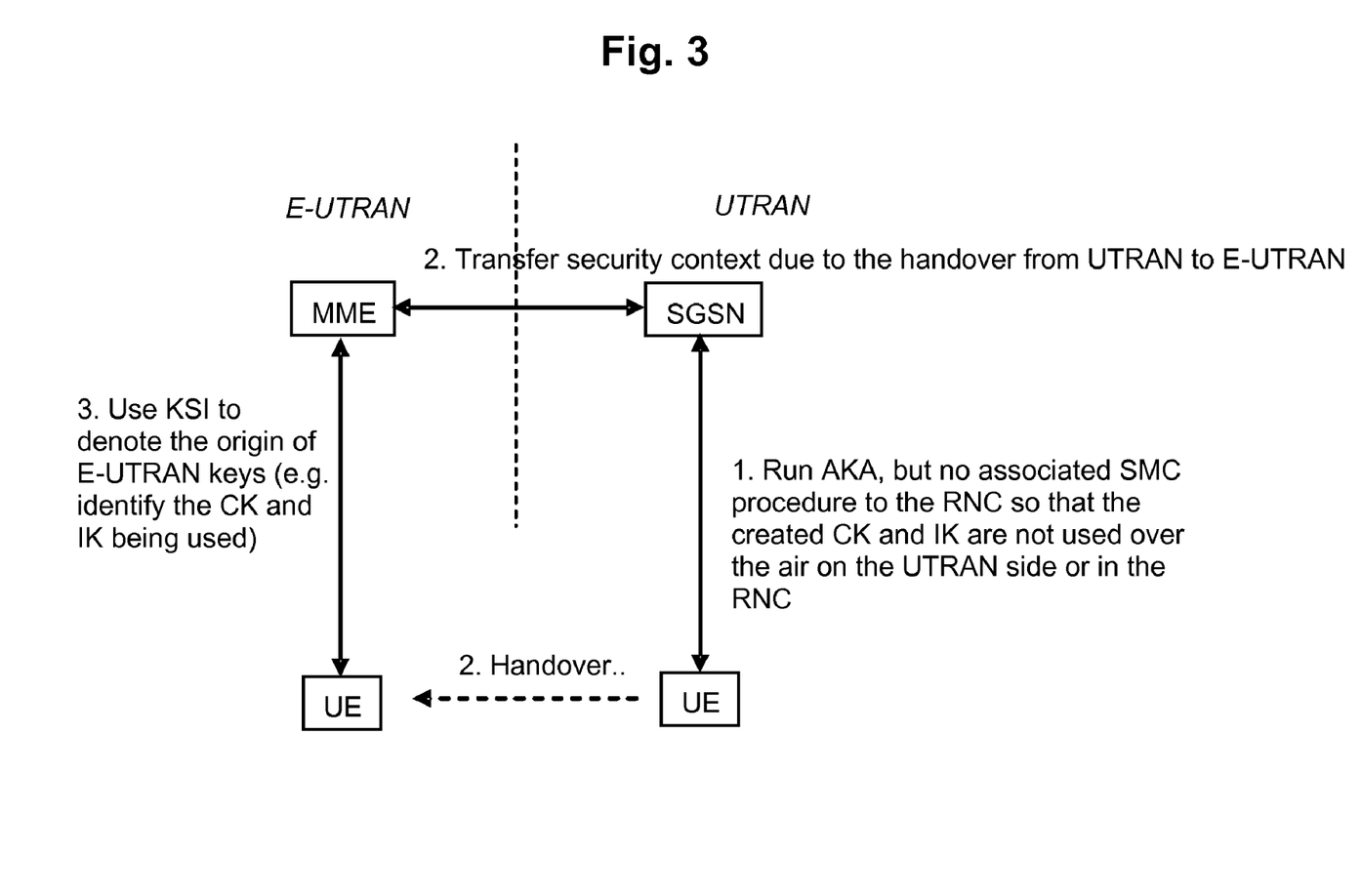
FIG. 3 shows a survey of an embodiment of the present invention.

FIG. 3 shows a survey of the embodiment of the present invention.

According to the survey, step S1 may perform the following without being restricted thereto: e.g. an (EAP-) AKA may be run without an associated SMC procedure to the RNC, so that the created CK and IK may not be used e.g. over the air on the UTRAN/GERAN side or in the RNC.

Further, step S2 may perform the following, without being restricted thereto: security context transfer due to the handover e.g. from UTRAN/GERAN to E-UTRAN.

Finally, step S3 may perform the following without being restricted thereto: use e.g. KSI to denote the origin of E-UTRAN keys (e.g. identify the CK and IK being used e.g. between the UE 201 and the MME 2022)

Furthermore, the UE 201 and/or SGSN 2021/MME 2022 according to the present embodiment may also be implemented as a chipset or module.

In addition, the present embodiment also relates to a system which may comprise both the UE 201 and the SGSN 2021/MME 2022.

Without being restricted to the details following in this section, the embodiment of the present invention may be summarized as follows:

The embodiment may reside in running (EAP-) AKA without a Security Mode Command procedure on the UTRAN/GERAN side before handover to the E-UTRAN and to use these fresh keys from the run (EAP-) AKA procedure on the E-UTRAN side instead of the used CK and IK. The fresh keys can be identified on the E-UTRAN side with the associated Key Set Identifier (KSI) from the (EAP-) AKA procedure.

The embodiment may also reside in that the UE can use the KSI to point to the cached keys on the E-UTRAN side instead of the transferred keys from the UTRAN/GERAN SGSN (either old CK and IK or the fresh keys based on the (EAP-) AKA run without SMC).

The embodiment may also reside in that the E-UTRAN side security context in the MME can be transferred to the UTRAN/GERAN side (e.g. as a transparent container) so the E-UTRAN side MME does not have to cache the UE context for UEs that are not attached. The "cached" E-UTRAN (security) context (e.g. session keys, counter values, key set identifiers, UE security capabilities, etc.) moves with the UE from SGSN to MME and from MME to SGSN.

Further Embodiments

For the purpose of the present invention as described herein above, it should be noted that an access technology may be any technology by means of which a user equipment can access an access network (or base station, respectively). Any present or future technology, such as WLAN (Wireless Local Access Network), WiMAX (Worldwide Interoperability for Microwave Access), Blue-Tooth, Infrared, and the like may be used; although the above technologies are mostly wireless access technologies, e.g. in different radio spectra, access technology in the sense of the present invention may also imply wirebound technologies, e.g. IP based access technologies like cable networks or fixed line.

an access network may be any device, unit or means by which a station entity or other user equipment may connect to and/or utilize services offered by the access network; such services include, among others, data and/or (audio-) visual communication, data download etc.;

generally, the present invention is applicable in those network/user equipment environments relying on a data packet based transmission scheme according to which data are transmitted in data packets and which are, for example, based on the Internet Protocol IP. The present invention is, however, not limited thereto, and any other present or future IP or mobile IP (MIP) version, or, more generally, a protocol following similar principles as (M)IPv4/6, is also applicable;

a user equipment may be any device, unit or means by which a system user may experience services from an access network;

method steps likely to be implemented as software code portions and being run using a processor at the network element, are software code independent and can be specified using any known or future developed programming language as long as the functionality defined by the method steps is preserved;

generally, any method step is suitable to be implemented as software or by hardware without changing the idea of the present invention in terms of the functionality implemented;

method steps and/or devices, units or means likely to be implemented as hardware components at a user equipment or base station, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection, such as AKA and/or EAP-AKA;

devices, units or means (e.g. user equipment and base station) can be implemented as individual devices, units or means, but this does not exclude that they are implemented in a distributed fashion throughout the system, as long as the functionality of the device, unit or means is preserved.

LIST OF ABBREVIATIONS

3GPP 3$^{rd}$ Generation Partnership Project
UE User Equipment
MME Mobility Management Entity
SGSN Serving GPRS Support Node
GPRS General Packet Radio Service
UTRAN UMTS Terrestrial Radio Access Network
GSM Global System for Mobile communication
EDGE Enhanced Data rates for Global Evolution
GERAN GSM EDGE Radio Access Network
UMTS Universal Mobile Telecommunications System
EAP Extensible Authentication Protocol
AKA Authentication and Key Agreement
SMC Security Mode Command
E-UTRAN Evolved UTRAN
EPS Evolved packet system
KSI Key Set Identifier
CK Ciphering Key
IK Integrity Key
HSPA High Speed Packet Access (or HSUPA/HSPDA)

The invention claimed is:

1. An apparatus, comprising at least one processor and at least one memory storing program code, the memory and program code being configured to, with the processor, direct the apparatus to at least:
   receive, prior to a handover operation, first key indication information;
   cause, prior to the handover operation, key information to be created based on the received first key indication information;
   cause the created key information to be retained;
   cause to be sent, after the handover operation, the received first key indication information upon which the creation of the key information was based; and
   cause, after the handover operation, the created key information to be retrieved based on the received first key indication information;
   wherein:
      the key information comprises at least one of a ciphering key or an integrity key, or
      the first key identification information comprises a key set identifier;
   and further wherein:
      the apparatus is a user equipment, or
      the apparatus is compliant to at least one of:
         a universal mobile telecommunications system terrestrial radio access network,
         a global system for mobile communication enhanced data rates for global evolution radio access network, or
         an evolved universal mobile telecommunications system terrestrial radio access network.

2. The apparatus according to claim 1, wherein the apparatus is further directed to perform at least one of the following:
   cause a response indicative of a successful creation of the key information to be sent; or
   participate in the handover operation, the handover operation being performed between a first network entity and a second network entity.

3. The apparatus according to claim 1, wherein the apparatus is further directed to:
   cause at least a portion of a challenge/response protocol to be performed, the challenge/response protocol comprising at least one of an authentication and key agreement protocol or an extensible authentication protocol.

4. The apparatus according to claim 1, wherein the apparatus is further directed to cause retained information to be dispensed with a security mode command.

5. The apparatus according to claim 1, wherein the apparatus is further directed to:
   cause a selected context to be indicated by including a corresponding key set identifier into a handover confirm message and causing the handover confirm message to be sent to a target evolved node B, the selected context being one of a cached security context or a mapped security context depending on whether the cached security context is present or not.

6. The apparatus according to claim 1, wherein the apparatus is further directed to:
   cause one of a key set identifier related to an access security management entity or a key set identifier related to a serving general packet radio service support node of a mapped security context to be inserted into a transparent container depending on whether a cached security context is present or not.

7. The apparatus according to claim 1, wherein the apparatus is further directed to:
   cause to be provided, a key related to an evolved node B based on a mapped security context and a cached security context for a target evolved node B along with a key set identifier related to an access security management entity and a key set identifier related to a serving a general packet radio service support node depending on whether the cached security context is present in a mobility management entity or not.

8. An apparatus, comprising at least one processor and at least one memory storing program code, the memory and program code being configured to, with the processor, direct the apparatus to at least:
   cause, prior to a handover operation, first key indication information to be generated, the first key indication information being configured to enable key information to be created based thereon;
   cause, prior to the handover operation, the generated first key indication information to be sent; and
   receive, after the handover operation is successfully completed, second key indication information corresponding to the generated first key indication information
   wherein:
      the key information comprises at least one of a ciphering key or an integrity key, or
      the first key identification information comprises a key set identifier;
   and further wherein:
      the apparatus is a user equipment, or
      the apparatus is compliant to at least one of:
         a universal mobile telecommunications system terrestrial radio access network,
         a global system for mobile communication enhanced data rates for global evolution radio access network, or
         an evolved universal mobile telecommunications system terrestrial radio access network.

9. The apparatus according to claim 8, wherein the apparatus is further directed to perform at least one of the following:
  receive a response indicating that the key information was successfully created; or
  participate in the handover operation, the handover operation being performed between a first network entity and a second network entity.

10. The apparatus according to claim 8, wherein the apparatus is further directed to cause at least a portion of a challenge/response protocol to be performed, the challenge/response protocol comprising at least one of an authentication and key agreement protocol or an extensible authentication protocol.

11. The apparatus according to claim 8, wherein the apparatus is further directed to receive based on a security context transfer.

12. The apparatus according to claim 8, wherein:
  the second key identification information comprises a key set identifier.

13. The apparatus according to claim 8, wherein the apparatus further comprises at least one of a serving general packet radio service support node or a mobility management entity.

14. The apparatus according to claim 8, wherein the apparatus is further directed to:
  cause a selected context to be indicated by including a corresponding key set identifier into a handover confirm message and causing the handover confirm message to be sent to a target evolved node B, the selected context being one of a cached security context or a mapped security context depending on whether the cached security context is present or not.

15. The apparatus according to claim 8, wherein the apparatus is further directed to:
  cause one of a key set identifier related to an access security management entity or a key set identifier related to a serving general packet radio service support node of a mapped security context to be inserted into a transparent container depending on whether a cached security context is present or not.

16. The apparatus according to claim 8, wherein the apparatus is further directed to:
  cause to be provided, a key related to an evolved node B based on a mapped security context and a cached security context for a target evolved node B along with a key set identifier related to an access security management entity and a key set identifier related to a serving a general packet radio service support node depending on whether the cached security context is present in a mobility management entity or not.

17. A non-transitory computer-readable medium bearing computer program code embodied therein, the computer program code being configured to, upon execution, direct an apparatus to at least:
  receive, prior to a handover operation, first key indication information;
  cause to be created, prior to the handover operation, key information based on the received first key indication information;
  cause the created key information to be retained;
  cause, after the handover operation, the received first key indication information to be sent; and
  cause, after the handover operation, the retained key information to be retrieved based on the first key indication information
wherein:
  the key information comprises at least one of a ciphering key or an integrity key, or
  the first key identification information comprises a key set identifier;
and further wherein:
  the apparatus is a user equipment, or
  the apparatus is compliant to at least one of:
    a universal mobile telecommunications system terrestrial radio access network,
    a global system for mobile communication enhanced data rates for global evolution radio access network, or
    an evolved universal mobile telecommunications system terrestrial radio access network.

* * * * *